July 25, 1939.  A. C. GUTENBERG ET AL  2,167,110
AUTOMATIC THROTTLE CONTROL
Filed Feb. 14, 1938     3 Sheets-Sheet 1
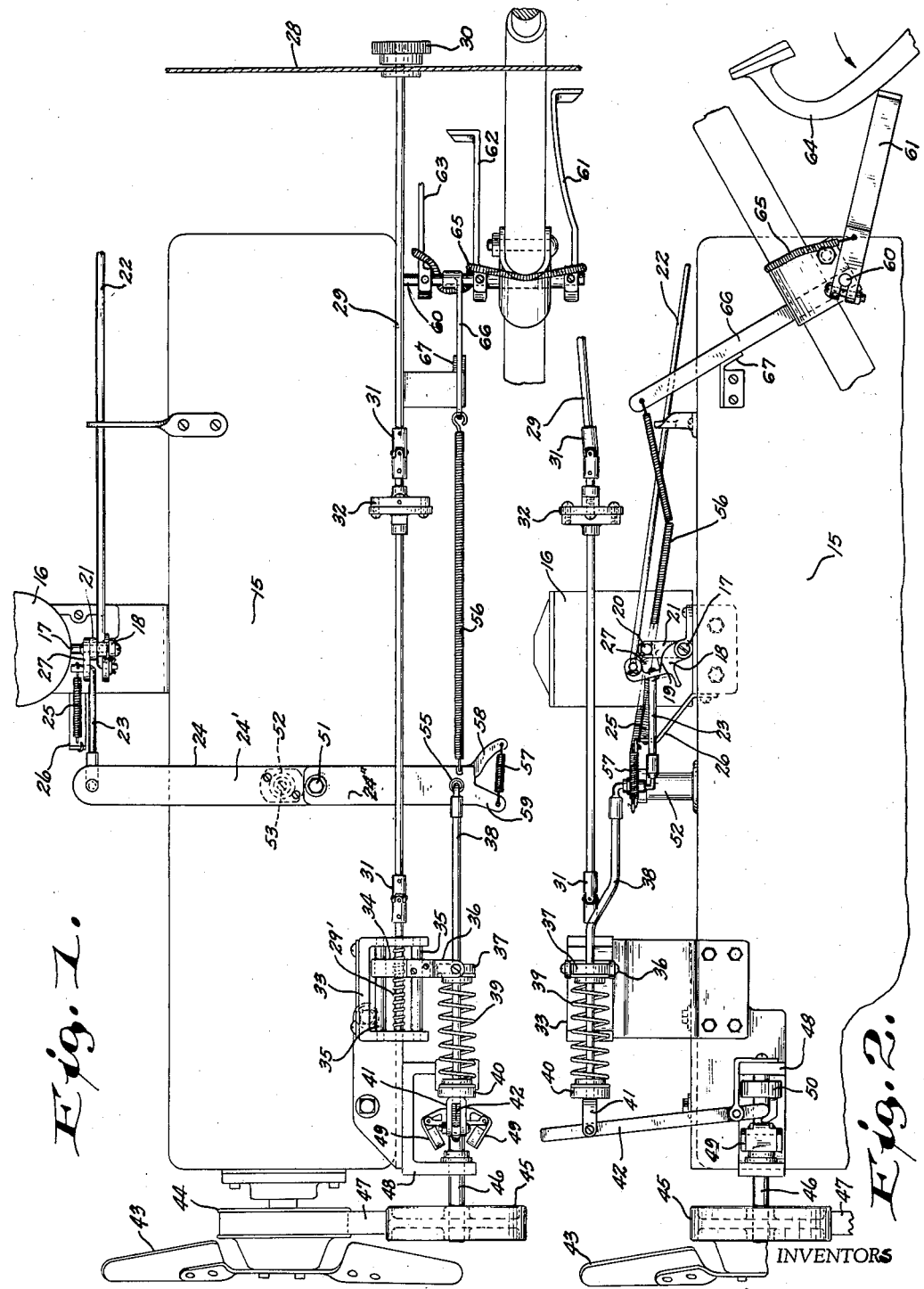
INVENTORS
Andrew C. Gutenberg &
Rodger L. Brower,
BY Morsell, Liebel & Morsell
ATTORNEYS July 25, 1939.  A. C. GUTENBERG ET AL  2,167,110
AUTOMATIC THROTTLE CONTROL
Filed Feb. 14, 1938  3 Sheets-Sheet 2
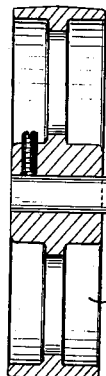
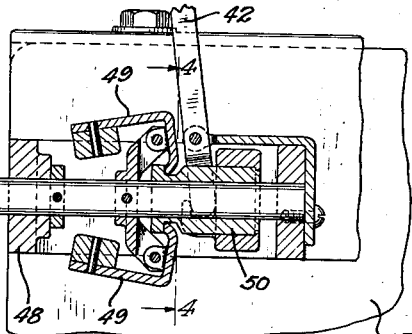
Fig. 3.
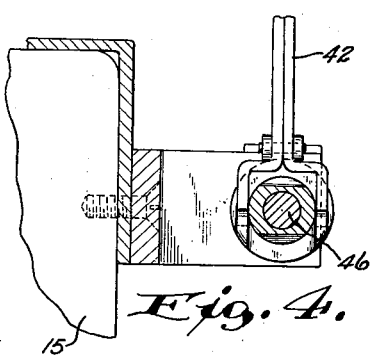
Fig. 4.
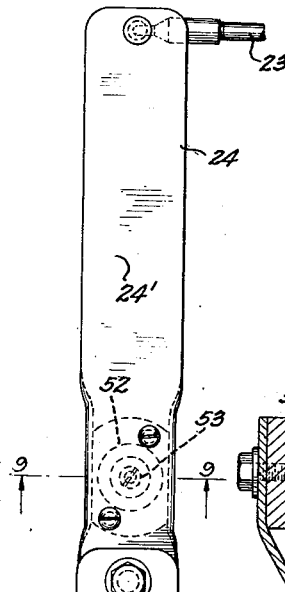
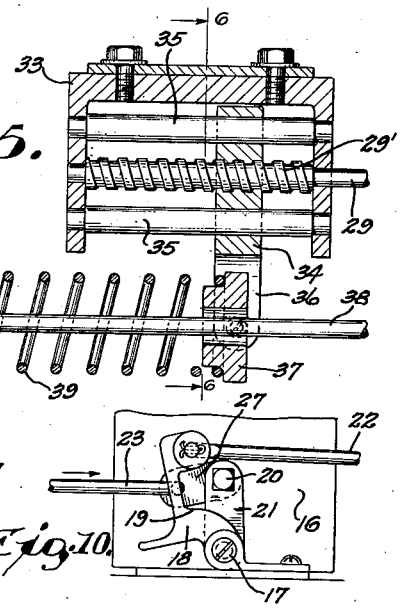
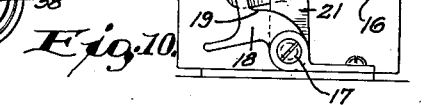
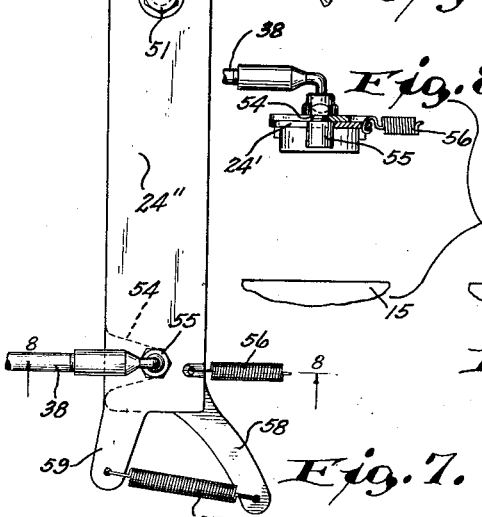
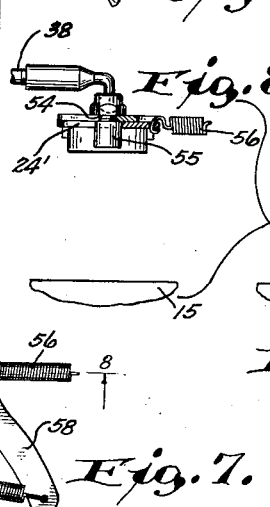
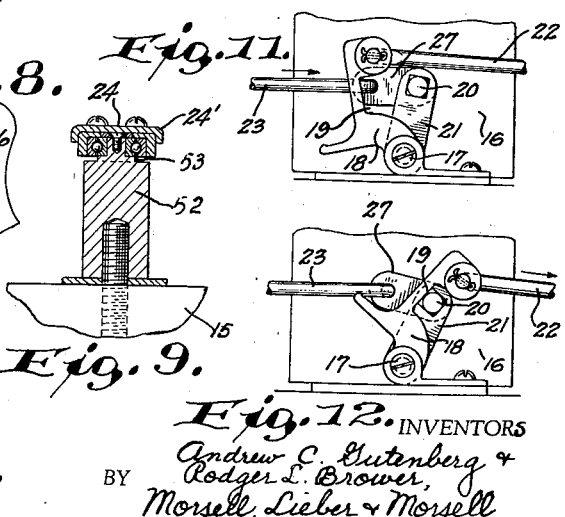
Fig. 5.
Fig. 6.
Fig. 8.
Fig. 9.
Fig. 7.
Fig. 10.
Fig. 11.
Fig. 12.
INVENTORS
Andrew C. Gutenberg &
Rodger L. Brower,
BY Morsell, Lieber & Morsell
ATTORNEYS.

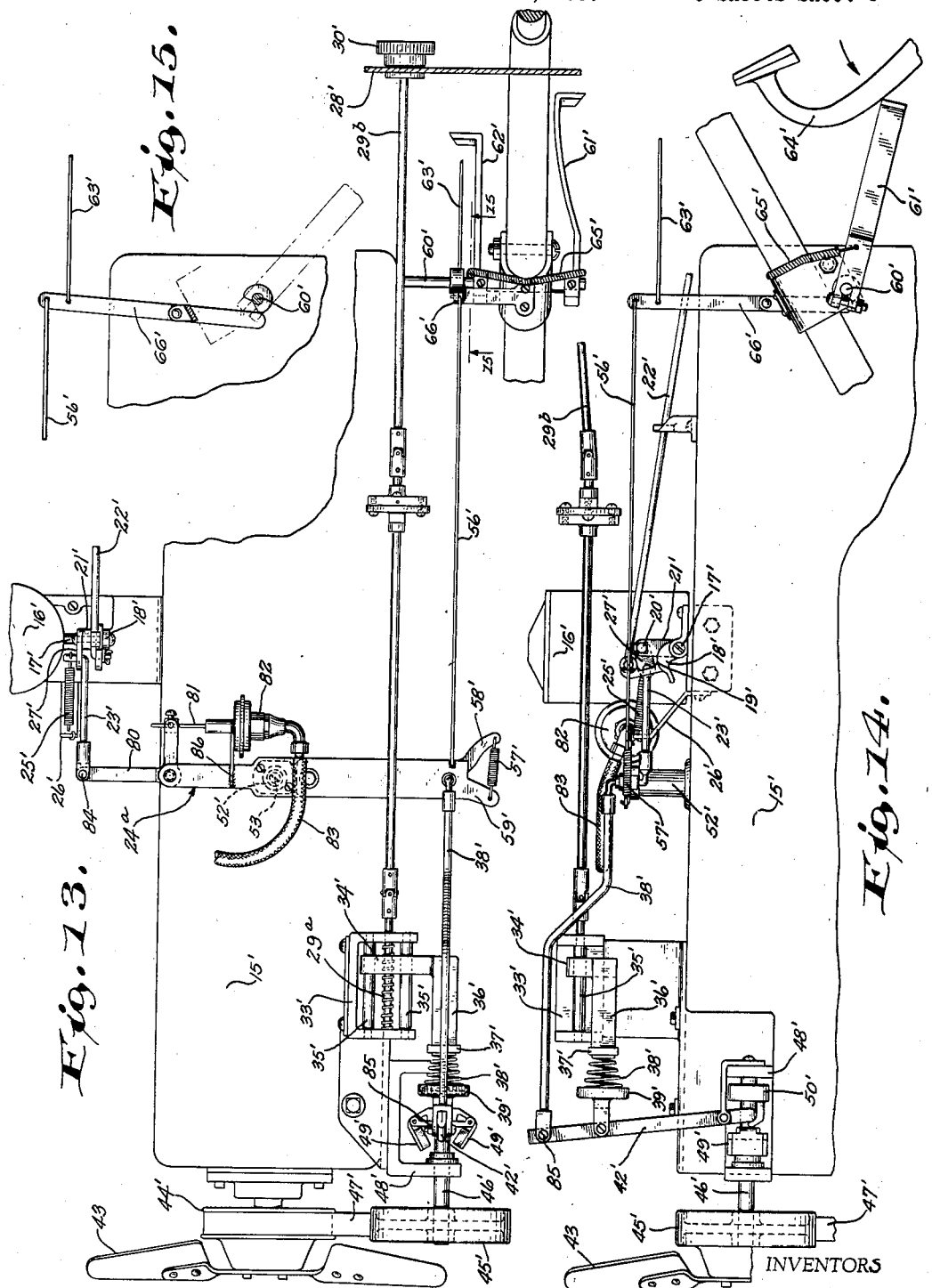

Patented July 25, 1939

2,167,110

UNITED STATES PATENT OFFICE 2,167,110

AUTOMATIC THROTTLE CONTROL

Andrew C. Gutenberg and Rodger L. Brower,
Milwaukee, Wis.

Application February 14, 1938, Serial No. 190,365

7 Claims. (Cl. 192—3)

The invention relates to improvements in automatic throttle controls, and more particularly to an adjustable speed controlling device for internal combustion engine propelled vehicles.

A primary object of the present invention is to provide a throttle controlling device for motor vehicles which will automatically accelerate the engine up to or decelerate it from a set speed without requiring the use of the ordinary accelerator pedal or hand throttle control.

A further object of the invention is to provide an automatic throttle control for motor vehicles whereby the speed, acceleration, and deceleration of the vehicle is controlled entirely through ordinary manipulation of either the standard brake or clutch pedals, with the result that operation of a vehicle is rendered extremely simple and convenient, and the operator is required to use his feet only for movement of said pedals.

A further object of the invention is to provide a motor vehicle automatic throttle control which will effect a saving in fuel consumption and which will prevent undesired engine racing.

A further object of the invention is to provide a motor vehicle automatic throttle control having a manually operated dash control member permitting predetermined and advance regulation of the carburetor butterfly valve and consequent regulation of the maximum speed of travel of the vehicle.

A further object of the invention is to provide a motor vehicle automatic throttle control equipped with a governor which cooperates in insuring a constant motor speed.

A further object of the invention is to provide a motor vehicle automatic throttle control which permits independent and normal use of the vehicle foot accelerator, when desired, whereby the speed of travel of the vehicle may be increased over that for which the controlling device is set.

A further object of the invention is to provide a motor vehicle automatic throttle control which is of very simple construction, is easy to operate, which may be easily mounted on any form of internal engine propelled vehicle with a minimum of effort and modification, which is strong and durable, and which is well adapted for the purposes set forth.

With the above and other objects in view, the invention consists of the improved automatic throttle control for motor vehicles, and its parts and combinations as set forth in the claims, and all equivalents thereof.

In the accompanying drawings in which the same reference characters indicate the same parts in all of the views:

Fig. 1 is a plan view of the engine of a motor vehicle showing the improved automatic throttle control applied thereto and to the instrument panel and the brake and clutch pedals, the instrument panel being shown in section;

Fig. 2 is a side view of the showing in Fig. 1 with the instrument panel omitted;

Fig. 3 is an enlarged fragmentary side view of the forward end of the motor block and showing in section the governor portion of the control mechanism mounted thereadjacent;

Fig. 4 is a vertical sectional view taken on line 4—4 of Fig. 3;

Fig. 5 is an enlarged, fragmentary horizontal sectional view of that portion of the device immediately associated with the governor;

Fig. 6 is a sectional view taken on line 6—6 of Fig. 5;

Fig. 7 is an enlarged plan view of the carburetor controlling lever;

Fig. 8 is a transverse sectional view taken on line 8—8 of Fig. 7;

Fig. 9 is a transverse sectional view taken on line 9—9 of Fig. 7;

Figs. 10, 11 and 12 are fragmentary detail views showing different positions of the carburetor butterfly valve levers when acted upon by the auxiliary throttle control rod and the normal foot accelerator rod, respectively;

Fig. 13 is a plan view of the engine of a motor vehicle showing a modified form of throttle control device applied thereto and in association with the brake and clutch pedals and the instrument panel of the vehicle;

Fig. 14 is a side view of the showing in Fig. 13 with the instrument panel omitted; and Fig. 15 is a detail sectional view taken on line 15—15 of Fig. 13.

Referring now more particularly to the drawings, it will appear that the motor block of a vehicle equipped with an internal combustion engine is designated by the numeral 15 and said engine has the usual carburetor 16 from which a mixture of fuel and air is fed to the cylinders of the engine. A usual butterfly valve (not shown) is movably mounted within the carburetor and said valve is fast on an outwardly extending shaft 17 so that turning movement of said shaft in either direction will cause opening and closing movements of the carburetor butterfly valve. Exteriorly of the carburetor and loose on the shaft 17 is an eccentrically shaped arm 18 formed with a recess 19 to accommodate, under certain conditions, a stud 20 on the upper end of a carburetor control arm 21. The first arm 18 has pivotally secured thereto the inner end of an elongated rod 22 which is extended to the usual foot accelerator pedal (not shown) which in actual practice is movably projected above the floor board in the operator's compartment of the motor vehicle. The carburetor control arm 21 has secured thereto a link 27 which carries one end of an operating rod 23 extending in a direction opposite to that of the rod 22 and pivotally secured at its other end to a lever 24. Movements of the rod 23 through the means hereinafter to be explained, rocks the arm 21 in either direction to open or close the butterfly valve. A movement of said arm in a direction to open the butterfly valve elongates a coiled spring 25 attached to the arm 21 and to a support 26.

The usual dash or instrument board of a motor vehicle is indicated by the numeral 28 and in the present invention one end portion of an elongated operating connection 29 is extended through said board and carries an operating knob 30. Said connection 29 is formed of sections connected together by universal joints 31 and a flexible coupling 32, the former permitting angular disposition of certain sections and the latter preventing the transmission of vibrations to the board 28.

Mounted at the forward end of the motor block 15 at the top thereof and adjacent one side, is a U-bracket 33 through which a screw threaded end portion 29' of the elongated connection 29 is journaled. A traveling nut 34 is adapted to move on the screw threaded portion 29' of the connection and said nut is guided by and slides on spaced guide rods 35 in the bracket 33. The laterally projecting end of the traveling nut 34 rigidly carries a yoke 36 to which is secured a shouldered ring 37. A rod 38 extends freely through said ring and a coiled spring 39, and connects with a shouldered disc 40 which has arms 41 extending to and pivotally connected with the upper end portion of a governor lever 42. The coiled spring 39 is interposed between and has opposite ends seated against the shouldered faces of the members 37 and 40.

The standard fan of the internal combustion engine is designated by the numeral 43 and said fan is driven in the usual manner from the engine crank shaft. The fan shaft carries a pulley wheel 44 engaged by a driving belt 47. On the governor shaft 46 there is a fly wheel 45 which is frictionally engaged and driven by said belt 47. Said governor shaft is journaled in a bracket 48 mounted on the engine below and forwardly of the traveling nut bracket 33. The governor includes weighted arms 49 on the shaft 46 and when said shaft is revolved the arms are thrown outwardly, more or less, by centrifugal force and the inner ends of said arms engage a governor collar 50 to slide it longitudinally on the governor shaft and thereby move the governor lever 42 which is pivotally mounted and connected at its lower end to the governor collar 50.

The lever 24 comprises an elongated member 24' extended transversely over the motor block and a shorter section 24" superimposed on the portion of the member 24' adjacent the connections 29 and 38. The inner end of the section 24" is pivotally attached to the member 24', as at 51, while the composite lever 24 is centrally pivotally mounted on a vertical post 52, as at 53. As shown in Fig. 7, the outer end of the under section 24' of the lever has a slot 54 extending inwardly from the side adjacent the governor. A stud 55, to the upper end of which the rod 38 is attached, extends through the section 24" and into said slot 54. Therefore, when there is a pull on the rod 38, the lever section 24" is moved independently of the section 24'. Normally, however, said stud 55 abuts against the inner end of its slot 54, so that a push on the outer end of the lever section 24', imposed by the rod 38, will swing the composite lever 24 in a counter clockwise direction relative to the drawings. The section 24' of the lever may be moved in the same direction by a pull imposed through the attached spring 56. The superimposed end portions of the lever section 24' and 24" are urged toward each other by a spring 57, connected between extensions 58 and 59 on the sections 24' and 24" respectively. The tension of the spring 56 is however stronger than that of the spring 57.

The numeral 60 (see Figs. 1 and 2) designates a transverse suitably supported shaft having fast thereon the inner ends of levers 61, 62 and 63, which levers extend adjacent and are operated by means of the usual clutch and foot brake pedals and the hand brake lever of the motor vehicle. In the present exemplification, the lever 61 is actuated by the clutch pedal 64, the lever 62 is actuated by the foot brake pedal of the vehicle, and the lever 63 is actuated by the hand brake lever of the vehicle. The depression of any of said levers through any pedal or hand brake will turn the shaft 60 in a clockwise direction relative to Figs. 1 and 2, and said levers and the shaft are returned to normal position by a spring 65. Fast on the shaft 60 is an arm 66 having the other end of the elongated spring 56 attached to its outer end. Movement of the shaft 60 in the direction indicated by actuation of either the levers 61, 62 or 63 will swing the arm 66 in the same direction and impose a pull on the spring 56 to move the member 24' in a desired direction. Return movement of the member 66 in the opposite direction is limited by abutment with a stop 67.

The operation of the improved automatic throttle controlling device is as follows: The arrangement of the parts as shown in Figs. 1 and 2 of the drawings illustrates an idling position whereby the motor may be operated at idling speed. When the operator desires to set the mechanism so as to effect automatic throttle control to maintain the vehicle speed at a desired limit, it is first necessary to turn the hand knob 30 in a direction so that the travelling nut 34 will be advanced toward the left, in Fig. 1 of the drawings, along the screw 29'. In order not to affect idling of the engine, there is a certain amount of play in the mechanism, so that there is no effect on the carburetor valve control shaft 17 until the travelling nut 34 has advanced a sufficient distance. Upon advancement of the travelling nut beyond this point, the following action takes place: Movement of the travelling nut compresses the spring 39 between the ring 37 and the disc 40. The tension of said spring is sufficient to then impose a push against the upper end of the governor lever 42. This movement of the governor lever pulls the rod 38 to the left, in Figs. 1 and 2, and thereby pivots the composite lever 24 a desired distance in a clockwise direction, the sections 24' and 24" operating together because of the connecting spring 57. This movement of the member 24 pushes the rod 23 rearwardly and thereby swings the carburetor control arm 21 to turn the butterfly valve shaft 17 in a direction to open the butterfly valve in the carburetor a required amount.

We may assume at this point that the knob 30 has been turned sufficiently far to effect an opening movement of the carburetor valve to permit an engine speed sufficient to propel the vehicle at approximately thirty miles per hour which would be substantially the adjustment for city driving. With the original manipulation of the knob 30, the operator is not required to give any more attention to the gas feed, accelerator or throttle control of the vehicle. Deceleration from the maximum setting thus obtained, and acceleration to said point is thereafter accomplished entirely by manipulation of either the lever 61 or the lever 62 through movement of either the clutch or foot brake pedal of the vehicle.

At this point, it should be observed that before the vehicle is set into motion and while the engine is running, after the knob adjustment has been made, the hand brake of the vehicle should be set so that the engine will then only operate at idling speed. The setting of the hand brake or operation of the clutch pedal or brake pedal serves to close the carburetor butterfly valve to idling speed in the following manner: A downward movement of either the lever 61, 62 or 63 will pull the member 66 in a clockwise direction and sufficiently far to stretch the spring 56 and cause it to impose a pull on the lever section 24' and this will swing the opposite end of said lever section in a counter clockwise direction, relative to the drawings, to thereby swing the carburetor control arm 21 in a direction to close off the butterfly valve to idling speed.

Assuming now that the adjustments previously mentioned have been made and that the vehicle is to be set into motion, the hand brake is released and then the mechanism becomes effective through the means previously described, to open the butterfly valve to the desired extent and to thereby permit automatic acceleration of the vehicle up to the desired point, and to maintain it at this speed. It will furthermore be obvious that the governor mechanism, during propulsion of the vehicle, immediately becomes effective to keep the motor speed constant. Through the carburetor control, a limit is set on the motor speed. However, if the vehicle is going down hill, for instance, the motor will tend to operate faster. The fan will obviously revolve at a greater rate of speed and through the belt connection, the flywheel 45 will be accelerated, and centrifugal force will cause the governor arms 49 to fly out further and the governor collar 50 will then be moved toward the left (relative to the drawings), on the governor shaft 46, and this will swing the governor lever 42 in a direction to push on the rod 38, such pushing action being resisted to some extent by the coiled spring 39. The pushing action imposed on the rod 38 will move the composite lever 24 in a direction to cause the carburetor control arm 21 to move toward its valve closing position. As soon as the carburetor is closed off to some extent, the engine speed will be slower, and then the governor will be operated in a manner so that the governor arm 42 will move in the other direction and swing the composite lever 24 in a direction to permit opening movement of the butterfly valve. Thereby, a balance is maintained as between the amount of movement of the carburetor control arm and the movement of the governor lever 42, as effected by the motor speed.

During operation of the vehicle, it will of course be necessary to decelerate it at any desired time, and this is accomplished by pushing downwardly on either the foot brake or clutch pedals. A movement of one of said pedals will then depress either the lever 61 or the lever 62, and through the spring 56, the carburetor control lever 24 will be moved in a direction to effect movement of the carburetor control arm 21 to or toward closing position. In stopping the vehicle, it is of course the ordinary practice to depress the foot brake pedal alone, or the foot brake pedal and the clutch pedal. This ordinary procedure will, in the present invention, accomplish the additional function of closing off the butterfly valve, and release of one of said pedals will automatically open up the butterfly valve to the desired point so that the engine can accelerate in speed to the speed for which it was set. Obviously, further movement of the knob 30 beyond that described, will cause further advancement of the travelling nut 30 along the screw 29' and consequent greater opening movement of the butterfly valve control lever 21.

The improved mechanism does not prohibit acceleration of the vehicle through operation of the foot throttle pedal in the usual manner. Opening of the butterfly valve in the usual manner beyond that for which it was set through the mechanism, is especially provided for so that temporary excessive acceleration of the vehicle is possible for hill climbing or for emergency usage in passing cars. When normal foot acceleration for the specified purposes is necessary, the driver depresses the foot accelerator pedal in the usual manner, and this pulls the foot accelerator rod 22 to the right, (relative to Figs. 1 and 2). The carburetor foot accelerator arm 18, which is loose on the shaft 17, then abuts against the stud 20 on the carburetor control arm 21 and advances said control arm 21 beyond the position for which it was set, permitting greater opening movement of the carburetor butterfly valve. Upon release of the accelerator foot pedal, the rod 22 moves in the other direction and the carburetor control arm 21 swings back to its normal open position, this being accomplished by the spring 25, which is of less tension than the springs which influence movement of the composite lever 24.

A modification of the invention is illustrated in Figs. 13, 14 and 15 of the drawings, and from said views it will be evident that in general the mechanism is similar to that of the principal form of the invention with the addition of a vacuum unit for acting on the main control lever which makes the device more sensitive in operation and increases its efficiency and flexibility. In order that the relationship of the parts may be readily appreciated, the elements of the mechanism of the modified form of the invention will be reviewed.

The vehicle motor block of the modification is indicated by the numeral 15', and the numeral 16' designates the carburetor, which carburetor has the usual butterfly valve (not shown). The butterfly valve is fast on an outwardly extending shaft 17' so that turning movement of said shaft in either direction will cause opening and closing movements of the carburetor butterfly valve. Exteriorly of the carburetor and loose on the shaft 17' is an eccentrically shaped arm 18' formed with a recess 19' to accommodate, under certain conditions, a stud 20' on the upper end of a carburetor control arm 21'. The shaft arm 18' has pivotally secured thereto the inner end of an elongated rod 22' which is extended to the usual foot accelerator pedal (not shown) in the operator's compartment of the vehicle. The carburetor control arm 21' has secured thereto a link 27' which carries one end of an operating rod 23' extending in a direction opposite to that of the rod 22' and pivotally secured at its other end to an element of a sectional lever 24a. Movement of the rod 23', through the means later to be explained, rocks the arm 21' in either direction to open or close the butterfly valve. A movement of said arm in a direction to open said butterfly valve elongates the coiled spring 25' attached to the arm 21' and to a support 26'.

The dash or instrument board 28' has extended therethrough one end portion of an elongated operating connection 29' which carries on its inner end the operating knob 30'. The connection 29b is formed of sections connected together by universal joints and flexible couplings, as shown, for the purpose of permitting angular disposition of certain of the sections of the connection and for preventing the transmission of vibrations to the board 28'.

At the forward end of the motor block 15' there is rigidly mounted on the top of said motor block and toward one side, a U-bracket 33' through which a screw threaded end portion 29a of the elongated connection 29b is journaled. A traveling nut 34' is adapted to move on the screw threaded portion 29' of the connection, and said nut is carried by and slides on spaced guide rods 35'. The laterally projecting end of the traveling nut 34' carries a forwardly extending flanged arm 36' provided with an angular flange 37' at its forward end, against which one end portion of a coiled spring 38' is secured. The other end portion of said coiled spring is secured within a cupped member 39' which has an arm extending to and pivotally connected with an intermediate portion of a governor lever 42'.

The standard fan of the internal combustion engine is designated by the numeral 43, and said fan is driven in the usual manner from the engine crank shaft. The fan shaft carries a pulley wheel 44' engaged by a driving belt 47'. On a governor shaft 46' there is a fly wheel 45' which is frictionally engaged and driven by said belt 47'. The governor shaft is journaled in a bracket 48' mounted on the engine below and forwardly of the traveling nut bracket 33'. The governor includes weighted arms 49' on the shaft 46', and when said shaft is revolved the arms are thrown outwardly, more or less, by centrifugal force, and the inner ends of said arms engage a governor collar 50' to slide it longitudinally on the governor shaft and thereby move the governor lever 42' which is pivotally mounted and connected at its lower end to the governor collar 50'.

The lever 24a is similar to the lever 24 described in connection with the principal form of the invention and includes a pivotal underlying section having at one end a projection 58' which is connected by a spring 57' with the projection 59' on the overlying section of the lever. The composite lever 24a is centrally pivotally mounted on a vertical post 52', as at 53. While the composite lever 24a is substantially the same as the lever 24 of the principal form of the invention, it is nevertheless somewhat shorter and its inner end has pivotally secured thereto the intermediate portion of a bell crank lever 80. An end of one of the arms of the bell crank lever 80 is adjustably connected with a diaphragm actuated rod 81 connected with a diaphragm within a vacuum unit 82. A tube 83 extends from the other side of the vacuum unit and is adapted to be connected to the intake manifold of the internal combustion engine so that vacuums or suctions established through the tube 83 will react on the diaphragm within the vacuum unit 82 to reciprocate the rod 81 and thereby actuate the bell crank lever 80. The other end portion of the bell crank lever 80 is pivotally connected with the carburetor control operating rod 23', as at 84.

A transverse, suitably supported shaft 60' has fast thereon the inner ends of levers 61', 62' and 63', which levers extend adjacent and are operated by means of the usual clutch and foot brake pedals and the hand brake lever of the motor vehicle. For instance, the lever 61' is actuated by the clutch pedal 64', the lever 62' is actuated by the foot brake pedal, and the lever or rod 63' is actuated by the hand brake lever of the vehicle. The depression of any of said levers through any pedal or hand brake will turn the shaft 60' in clock-wise direction relative to Fig. 13, and said levers and the shaft are returned to normal position by a spring 65'. Arranged for actuation by the shaft 60', as best shown in Fig. 15, is a lever or arm 66' which has the hand brake lever or rod 63' connected thereto and which also has connected thereto an elongated connection 56' which extends to and connects with the underlying portion or section of the lever 24a. It should also be observed that an adjacent portion of the overlying section of the lever 24a has connected thereto one end of a rod or elongated connection 38', the other end portion of said connection 38' being pivotally connected to the upper end portion of the governor lever 42', as at 85. Movement of the shaft 60' in the proper direction by either the levers 61', 62' or 63' will swing the arm 66' in a direction so as to impose a pull on the elongated connection 56' to pivotally move the underlying section of the lever 24a against the tension of the spring 57'.

The operation of the modified form of throttle controlling mechanism illustrated in Figs. 13 to 15 inclusive is as follows: The arrangement of the parts as shown in Figs. 13 and 14 of the drawings illustrates an idling position whereby the motor may be operated at idling speed. When the operator desires to set the mechanism so as to effect automatic throttle control to maintain the vehicle speed at a desired limit, it is first necessary to turn the hand knob 30' in a direction so that the traveling nut 34' will be advanced toward the left in Figure 13, along the screw 29a. In order not to effect idling of the engine, there is a certain amount of play in the mechanism, so that there is no effect on the carburetor valve until the traveling nut 34' has advanced a predetermined distance. Upon advancement of the traveling nut beyond this allowed distance, the following action takes place: Movement of the traveling nut compresess the spring 38', and the tension of the spring is then sufficient to impose a force against the governor lever 42'. This movement of the governor lever pulls the rod or connection 38' to the left in Figs. 13 and 14, and thereby pivots the composite lever 24a in a clock-wise direction. This movement of the member 24a, with similar movement of the bell crank lever 80, pushes the rod 23' rearwardly and thereby swings the carburetor control arm 21' to turn the butterfly valve shaft 17' in a direction to open the butterfly valve in the carburetor the required amount. At this point it may be stated that this joint action of the members 24a and 80 is accomplished because the vacuum unit rod 81 holds the bell crank 80 rigid, and the vacuum unit 82 is rigidly supported from the lever 24a, as at 86.

Assuming that the knob 30' has been turned sufficiently far to effect an opening movement of the carburetor valve to permit an engine speed sufficient to propel the vehicle at approximately 30 miles per hour, the operator is then not required to give any more attention to the gas feed, or the accelerator, or throttle control of the vehicle. Deceleration from the maximum setting thus obtained, and acceleration to said point is thereafter accomplished entirely by manipulation of either the lever 61' or 62' through movement of either the clutch or foot brake pedals of the vehicle.

Before the vehicle is set into motion and while the engine is running, after the knob adjustment has been made, the hand brake of the vehicle should be set, and while set the engine will only operate at idling speed. When the vehicle is to be set into motion, the hand brake lever is released and then the mechanism becomes effective, through the means previously described, to open the butterfly valve to the desired extent and to thereby permit automatic acceleration of the vehicle up to the desired point, and to maintain it at this speed. As in the principal form of the invention during propulsion of the vehicle, the governor mechanism becomes immediately effective to keep the motor speed constant, and an important aspect of the modification being described is that the vacuum unit mechanism cooperates with the governor mechanism in insuring constant speed and in minimizing fuel consumption and in insuring even operation of the motor and vehicle.

It will not be necessary to repeat the manner in which the governor mechanism accomplishes the heretofore stated objects, but with respect to the vacuum until, it is to be stated that this acts as a check on the governor mechanism and acts in opposition thereto. When the engine is idling or when the vehicle is running at driving speeds, there is a high vacuum established in the tube 83, and consequently there is no expansion or contraction of the diaphragm in the vacuum unit such as will influence the bell crank lever 80. However when conditions attain which cause the governor to open the butterfly valve, the vacuum in the connection 83 will drop, and this will influence the diaphragm within the vacuum unit 82 to move the bell crank lever 80 in a counter clock-wise direction relative to Fig. 13. This movement of the bell crank lever forces the rod 23' to the left in Fig. 13 to effect a closing movement of the carburetor butterfly valve. This is in check of or opposition to the movement caused by the governor.

It will be clear that the automatic throttle control mechanism serves to operate the butterfly valve to a predetermined point to permit acceleration of the vehicle up to the desired speed. Without the vacuum unit, the tendency is, in the case of rapid acceleration, for the carburetor to choke up, because it has been opened up, and possibly more fuel may attempt to flow through than the engine can temporarily handle. The improved vacuum unit 82 prevents this objectionable contingency.

In the event that the parts have swung to open the carburetor valve, as previously described, the vacuum in the carburetor and intake manifold will immediately drop. When this condition occurs, it will of course influence the vacuum unit 82, and the rod 81 will be projected so as to swing the bell crank lever 80 in a counter clock-wise direction relative to Fig. 13, pulling the rod 23' in a direction to close the butterfly valve. This will therefore slow up the feed of fuel to the carburetor and prevent sufficient operation of the carburetor, and thereupon a greater vacuum will be established in the intake manifold, and the vacuum unit will become effective to thereafter move the bell crank lever 80 in a direction so as to additionally open the carburetor butterfly valve, but only to such an extent as the carburetor may accommodate the incoming fuel.

Obviously the vacuum unit acts as a check or balance on the functioning of the carburetor effected by operation of the governor. The vacuum unit tends to keep the carburetor valve in a more uniform open position such as will enhance the efficiency of operation, and will insure a more steady flow of fuel instead of permitting spasmodically the flow of too much or too little fuel.

In other respects the operation of the modified form of device follows that described in connection with the principal form of the invention.

From the foregoing description, it will appear that the improved automatic throttle controlling device is flexible in its operation and use, and simplifies normal driving of a motor vehicle. It maintains engine operation at a constant speed so that fuel consumption will be minimized and the vehicle will operate at a steady and constant speed. The mechanism has a desirable braking effect on the vehicle when it is going down a hill because it, through the governor, operates to close off the carburetor butterfly valve, and it facilitates starting a car on a hill, as manipulation by the operator's feet is only necessary for the usual pedals, and the foot accelerator does not have to be manipulated. The mechanism has safety advantages, as it eliminates fatigue of the driver because fewer manipulations are required, and a vehicle may be quickly stopped as this is accomplished by merely pressing down on either the brake or the clutch pedal which insures checking of the speed and simultaneous closing of the carburetor. The mechanism may be applied to any form of motor vehicle, and is especially advantageous in connection with tractors and like vehicles which have a heavy load imposed thereon and require a constant and adjustable pull. The mechanism is furthermore of simple and novel construction, is simple in its operation and adjustment, and is well adapted for the purposes described.

What is claimed as the invention is:

1. In a motor vehicle having an internal combustion engine with a carburetor, and a standard operating pedal, a movable arm for operating the carburetor valve, a pivotal lever for actuating said arm, yielding and adjustable connections extending from the vehicle dash to said lever and operable manually for effecting an initial open setting of the carburetor valve, a governor connected with the vehicle engine and interposed in said connections for automatically moving said lever for controlling the carburetor relative to its set condition in synchrony with the engine speed, yielding means controlled by the adjustment of said connection for repelling lever influencing operation of the governor commensurate with the initial open setting of the carburetor valve, and a yielding connection between the operating pedal and said lever for independently moving said lever.

2. In combination with a motor vehicle having an internal combustion engine, a controlling device extending adjacent the vehicle dash arranged for manual and adjustable settings for maintaining the engine speed at a predetermined limit, a fly ball governor operated by the engine and connected with the controlling device aiding in the maintenance of the engine speed at approximately the set limit, and mechanical means operated by and directly associated with the vehicle brake pedal for controlling the engine speed range within the set limit.

3. In a motor vehicle having an internal combustion engine with a carburetor, and a standard operating pedal, a movable arm for operating the valve of the carburetor, a composite pivotal lever for actuating said arm, the sections of said lever moving jointly under certain conditions and the sections of the lever operating independently under other conditions, yielding and adjustable connections extending from the vehicle dash to said composite lever for pivotally moving it in either direction, a governor connected with the vehicle engine and interposed in said connections for automatically moving said lever in both directions, yielding means controlled by adjustments of said connections for repelling lever influencing operation of the governor, a yielding connection between the operating pedal and said lever for independently moving the latter, and a manually operated connection for temporarily moving the carburetor control arm beyond the position in which it is normally maintained by said other means.

4. In a motor vehicle having an interal combustion engine with a fuel flow regulator and a standard operating pedal, an adjustable throttle controlling mechanism comprising, adjustable means for controlling maximum opening movements of the fuel flow regulator, means connected with said operating pedal for closing the fuel flow regulator, and means controlled by the engine speed and by suction conditions in the intake manifold of the engine for automatically closing the fuel flow regulator and for automatically opening it toward its set maximum open position.

5. In a motor vehicle having an internal combustion engine with a carburetor, and a standard operating pedal, a movable arm for operating the carburetor valve, adjustable means extended between the vehicle dash and said arm for originally moving the carburetor control arm to a predetermined opening position, means connected with the operating pedal for moving said control arm toward closing position, governor means connected with the engine for moving the control arm to and from its predetermined opening position, and suction controlled means connected with the engine for additionally moving said control arm toward and away from its predetermined opening opsition.

6. In combination with a motor vehicle having an internal combustion engine, a controlling device extending adjacent the vehicle dash arranged for manual and adjustable settings for limiting the engine speed, a fly ball governor operated by the engine and connected with said controlling device for maintaining the engine speed at the set limit, and a suction operated member operated by suction conditions in the engine and connected with said controlling device for influencing the controlling effect of said governor.

7. In combination with a motor vehicle having an internal combustion engine, a controlling device extending adjacent the vehicle dash arranged for manual and adjustable settings for maintaining the engine speed at a predetermined limit, a fly ball governor operated by the engine and connected with the controlling device aiding in the maintenance of the engine speed at approximately the set limit, engine operated suction means interposed in said controlling device for enhancing the effect of said governor, means operated by the vehicle brake pedal for controlling the engine speed range within the set limit, and means operated by the vehicle accelerator for temporarily releasing said speed limiting mechanism.

ANDREW C. GUTENBERG.
RODGER L. BROWER.